United States Patent [19]

Bensen

[11] Patent Number: 4,653,705

[45] Date of Patent: Mar. 31, 1987

[54] AUTOGYRO WITH AUXILIARY ROTOR DRIVE

[76] Inventor: Igor B. Bensen, P.O. Box 31047, Raleigh, N.C. 27612

[21] Appl. No.: 235,910

[22] Filed: Feb. 19, 1981

Related U.S. Application Data

[63] Continuation of Ser. No. 32,909, Apr. 24, 1979, abandoned.

[51] Int. Cl.$^4$ .................................................. B64C 27/02
[52] U.S. Cl. ..................................... 244/17.11; 244/60; 416/171
[58] Field of Search ............... 244/17.11, 17.13, 17.19, 244/17.23, 17.25, 17.27, 6, 7 A, 8, 58; 416/171, 170 B, 123

[56] References Cited

U.S. PATENT DOCUMENTS

| | | | |
|---|---|---|---|
| 1,974,738 | 9/1934 | De La Cierva | 416/171 |
| 1,980,999 | 11/1934 | Larsen | 244/17.27 |
| 3,049,321 | 8/1962 | Nichols | 244/17.19 |
| 3,253,807 | 5/1966 | Eickmann | 244/17.23 |
| 3,722,830 | 3/1973 | Barber | 244/17.23 |
| 3,983,833 | 10/1976 | Eickmann | 244/17.23 |

FOREIGN PATENT DOCUMENTS

| | | | |
|---|---|---|---|
| 1148657 | 12/1957 | France | 416/171 |
| 925301 | 5/1963 | United Kingdom | 244/17.25 |

Primary Examiner—Trygve M. Blix
Assistant Examiner—Rodney Corl
Attorney, Agent, or Firm—Mason, Fenwick & Lawrence

[57] ABSTRACT

An improved autogyro including a main airframe having a main engine and pusher propeller as customarily applied in autogyros, and a lifting rotor having an auxiliary drive for the lifting rotor for tapping a minor portion of power from the main propulsive engine and transmitting it to the rotor, including a three-stage compound mechanical-hydraulic transmission for transferring power from the main engine to the lift rotor, wherein the hydraulic portion of the transmission serves functions of providing continuously variable transmission speed ratio, torque converter type of inverse speed-torque relationship, a one-way check valve allowing the rotor to free-wheel, an overpressure relief valve to prevent overtorquing of the lift rotor, a bypass valve acting as a clutch to engage and disengage the power, and a manual shut-off valve acting as a rotor brake and rotor parking lock.

10 Claims, 3 Drawing Figures

U.S. Patent    Mar. 31, 1987    4,653,705
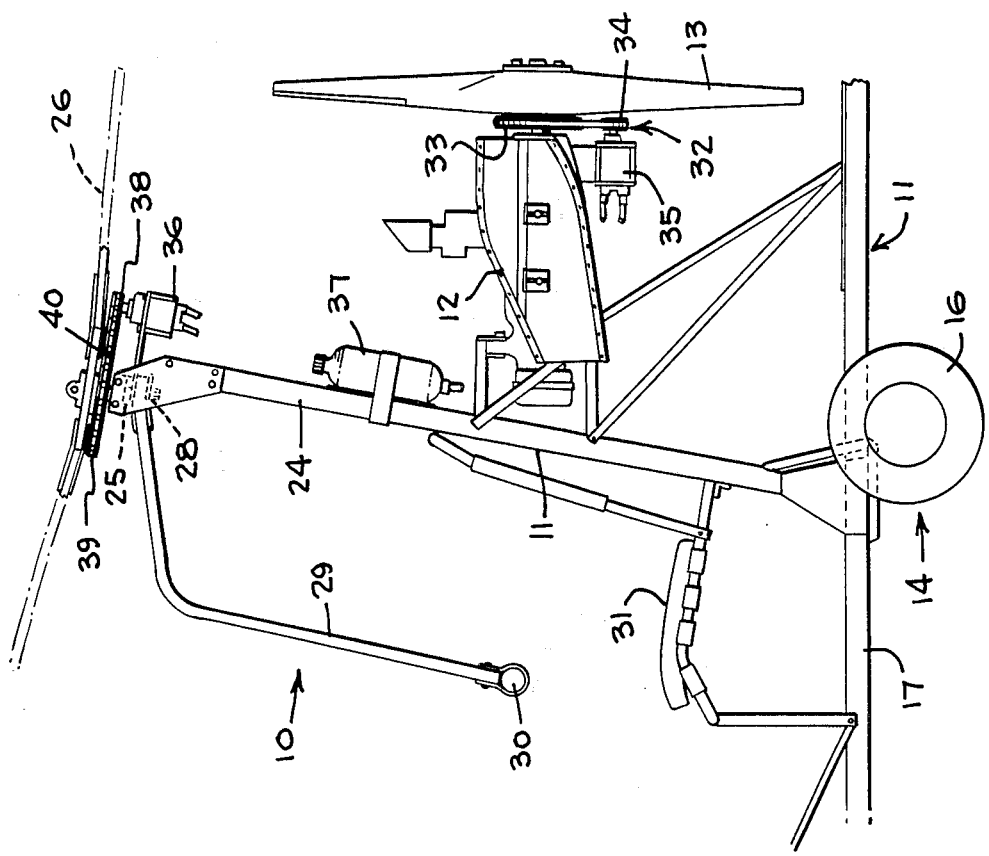
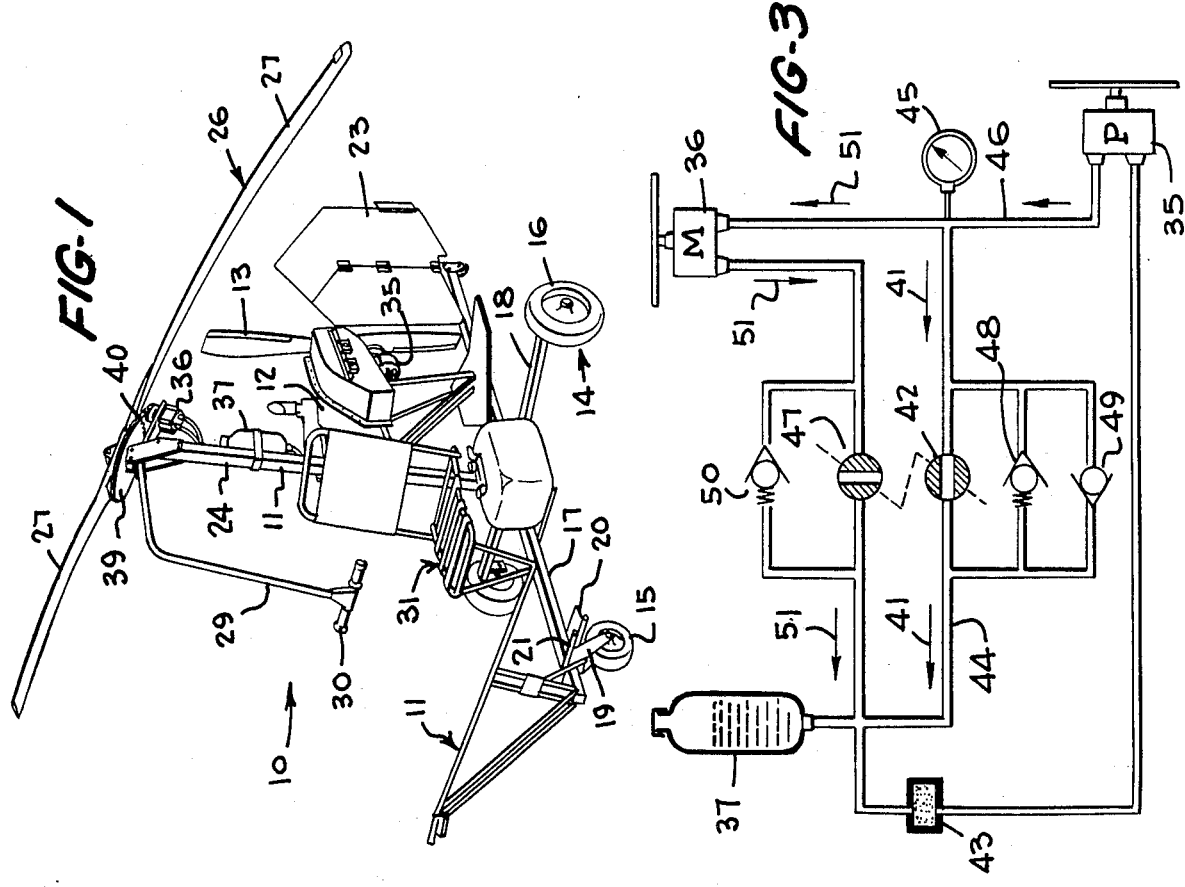

AUTOGYRO WITH AUXILIARY ROTOR DRIVE

This is a continuation of application Ser. No. 032,909, filed Apr. 24, 1979, now abandoned.

BACKGROUND AND OBJECTS OF THE INVENTION

The present invention relates in general to autogyros, and more particularly to autogyros having an airframe and the usual main propulsive engine and pusher propeller, and a lifting rotor provided with an auxiliary rotor drive in the form of a mechanical power takeoff from the main propulsive engine and a hydraulic transmission system for tapping a minor portion of power from the main engine and transmitting it to the rotor.

Autogyro type aircraft became almost extinct after the advent of helicopters in the 1940's. With autogyro rotors unpowered in flight, they were unable to hover and thus were less versatile than helicopters, but they are mechanically simpler and less expensive than helicopters. In flight operations where hovering capacity is not required, autogyros may still be preferred to helicopters and airplanes. Considerable amount of success has been achieved in the past to make autogyros more competitive to helicopters, especially in the area of giving more vertical takeoff capability. One of the efforts to give autogyros a vertical takeoff capability was the "jump takeoff" development, wherein the lift rotor was pre-rotated mechanically beyond its normal rotational speed and then simultaneously the drive was disconnected and and the collective pitch of the rotor blades increased. This produced a sudden helicopter-like downward flow of air through the rotor and enough vertical lift to "jump" the aircraft off the ground. As the speed and lift of the rotor decayed, enough forward speed was gained to continue flight with blades at reduced "autorotative" pitch without appreciable settling down. Although this "jump takeoff" development operated successfully, it failed to restore the autogyro to its earlier popularity.

Later, a new type of autogyro identified by the trade name "Gyrocopter" was developed, which retained the basic design features of the autogyro of obtaining lift from a free-running rotor whose blades were set in low "autorotative" pitch, and derived forward propulsion from a forward thrusting propeller, but was of "pusher" configuration, and its airframe was of simpler open-air skeletal construction. This aircraft lent itself to kit type marketing and construction at home by amateur hobbyists, and its popularity rapidly spread and soon exceeded that of earlier tractor types.

The present invention represents a further development to enhance operational versatility of the autogyro by equipping it with a continuous duty rotor drive. Unlike previous rotor drives which were of all-mechanical type and had fixed reduction ratio transmissions from engine to the rotor, the design of the present invention uses a compound transmission, one stage of which is hydraulic with a continuously variable speed ratio between input and output. In addition, while old style drives were disconnected before the takeoff, the proposed drive stays engaged in flight, which produces some reaction torque against the airframe, but its magnitude is small compared to helicopters and is beneficial in canceling the yaw torque produced by the propeller slipstream.

Provision of this continuous duty auxiliary rotor drive provides subtle, but nevertheless significant, advantages. Because its rotor is always driven during and after takeoff, the pilot can more accurately estimate the length of the pre-takeoff ground run, thus improving the safety of the machine in cross-country flying from unprepared fields, as well as during student training. Economy of operation is also improved, because horsepower fed directly to the rotor is spent more efficiently there than by the propeller. This permits flight at a reduced throttle and results in savings in fuel consumption. Providing for a continuous powering of the rotor by tapping a minor portion of power from the main engine also eliminates the danger of the rotor slowing down during "zero-g" pushover maneuvers, providing another important safety factor. It also provides smooth chatter-free and wear-free engagement of rotor power drive, and of rotor stopping action, by means of valves in a closed circuit hydraulic recirculating transmission.

An object of the present invention, therefore, is the provision of a novel autogyro having a continuous duty auxiliary rotor drive by providing a compound mechanical-hydraulic transmission to achieve transfer of a minor portion of power from the engine to the rotor, to achieve economy of operation, reduce length of pre-takeoff ground runs, minimize faulty operation during "zero-g" maneuvers and achieve desired flight characteristics not attainable by mere "autorotation" of the rotors from air flow rotating forces.

Another object of the present invention is the provision of an autogyro of the type described in the preceding paragraph, whrein the compound mechanical-hydraulic transmission and control system is arranged to prevent inadvertent simultaneous engagement of rotor drive and of rotor brake by combining both control operations into one, placing each function on the opposite ends of a single control movement.

Other objects, advantages and capabilities of the present invention will become apparent from the following detailed description, taken in conjunction with the accompanying drawings showing a preferred embodiment of the invention.

DETAILED DESCRIPTION OF THE FIGURES

FIG. 1 is a front perspective view of an autogyro constructed in accordance with the present invention;

FIG. 2 is a somewhat diagrammatic, side elevation view of the main propulsive engine and pusher propeller, and center portions of the lift rotor and auxiliary rotor drive components, and adjacent portions of the airframe, of the autogyro; and FIG. 3 is a diagrammatic view of the intermediate hydraulic stage of the mechanical-hydraulic auxiliary rotor drive.

DETAILED DESCRIPTION OF A PREFERRED EMBODIMENT

Referring to the drawings, wherein like reference characters designate corresponding parts throughout the several figures, there is shown, as an illustrative embodiment of the present invention, an autogyro, sometimes herein referred to as a "gyrocopter", indicated generally by the reference character 10, having a skeleton-type air frame 11 provided with an engine forming the main propulsion engine, indicated at 12, and, in the illustrated embodiment, provided with a pusher propeller 13 located rearwardly of the main propulsion engine 12 and, disposed for rotation about what may be referred to as the longitudinal/horizontal axis of the autogyro and air frame. The autogyro 10 in the illustrated embodiment, as shown in FIG. 1, is provided with tricycle landing gear indicated generally at 14, comprising a single front wheel 15 and a pair of rear wheels 16 supported from air frame members, which in the illustrated example comprise a main longitudinal or fore and aft air frame member referred to as a keel tube 17 and a main transverse axle tube or frame member 18. The rear wheels 16 in the illustrated embodiment are journalled on the transverse axle tube or frame member 18, for example, by wheel center shaft members journalled in supports at the opposite ends of the axle tube 18, while the front landing gear wheel 15 is journalled in a wheel supporting yoke 19 pivotally supported for rotation about a vertical axis from the main fore and aft keel tube 17 and having rigid foot pedal shaft members 20 extending oppositely laterally from the yoke member 19 affording operator foot controlled steering of the front wheel 15, and also having a front wheel brake plate on the pedal shaft members 20 by which the operator can achieve foot operated braking action on the front wheel 15. Foot rests 21 are also provided extending laterally from the keel tube 17 adjacent but above the front wheel pedal shaft members 20 and also brake rudder pedal members pivoted about a horizontal axis on the forward portion of the keel tube 17 and have wire linkage connections to the rudder 23 mounted on the rearmost portion of the keel tube 17.

Extending angularly upwardly and rearwardly from the mid-portion of the keel tube 17 is a mast member 24 having a main bearing housing 25 at its upper end providing the rotary journal mounting for the lift rotor 26 having oppositely extending blades 27 of usual airfoil cross sectional configuration. Immediately below the main bearing or rotor hub mechanism 25 is a control bearing housing 28 permitting angular movement of the lift rotor 26 and the plane of rotation of the blades thereof about a horizontal transverse axis paralleling the longitudinal axis of the axle member or tube 18, and this control bearing housing is rigidly connected to a control stick 29 which is an angular rigid control stick member terminating in grip members 30 at its lower end located at a convenient position in front of the pilot when seated in the pilot seat 31. Rigid frame members extending rearwardly from the mast and additional frame members extending upwardly from the keel tube 17 support the engine 12.

The previously described components are conventional structure incorporated in autogyros or gyrocopters, and will be well understood by persons ordinarily skilled in the relevant art without more detailed explanation. While the autogyro or gyrocopter 10 hereinabove described is of the pusher-type and is a single engine autogyro, it will be appreciated that the present invention may be applied to tractor-type aircraft or multi-rotor type and multi-engine type aircraft and that the methods of power transmission hereinafter described may be mechanical, electromagnetic, hydraulic, pneumatic, or any combination of these as will be well understood by designers ordinarily skilled in the art of rotary-wing aeronautics.

The present invention includes, in addition to the usual autogyro or gyrocopter components previously described, an auxiliary rotor drive consisting, in the illustrated embodiment, of a mechanical power takeoff from the main propulsion engine 12, a hydraulic intermediate stage and a final mechanical drive of the lift rotor 26. The first stage or mechanical power takeoff stage of the auxiliary rotor drive comprises, in the illustrated embodiment, a pair of pulleys and a V-belt indicated generally at 32, including the pulley 33 on the pusher propeller shaft for the propeller 13 and a pulley 34 on the shaft of a hydraulic pump 35 supported below the main propulsion engine 12, for example, from the engine block or supporting mechanism for the main propulsion engine 12. The hydraulic intermediate stage of the auxiliary rotor drive is primarily formed by the hydraulic pump 35, various interconnecting lines, fluid conduits and controls, to be later described in greater detail, together with the hydraulic motor 36 and the storage tank 37. The shaft of the hydraulic motor carries a sprocket, indicated at 38, of the final mechanical drive stage for the lift rotor 26. The final mechanical drive stage of the auxiliary rotor drive comprises the sprocket 38 mounted on the shaft of the hydraulic motor 36 and forming the drive sprocket, and a sprocket 39, forming the driven sprocket, mounted on the main lift rotor shaft and connected with the sprocket 38 by the chain 40 to directly drive the lift rotor 26. The mechanical power takeoff stage formed by the pulley and V-belt system 32 and hydraulic pump 35, and the final mechanical stage formed by the sprockets 38, 39, and chain 40 are of conventional design and require no further detailed description. The hydraulic intermediate stage formed of the hydraulic pump 35 and hydraulic motor 36 and the interconnecting control fluid lines and valves is illustrated schematically in FIG. 3 and will become clear from the following description of their five main operational cycles.

The first main operational cycle is the engine starting cycle, which begins when the operator starts the main propulsion engine 12 with both the engine 12 and the lift rotor 26 at a standstill. The flow of fluid in the hydraulic system follows the path indicated by the arrows 41 in FIG. 3 as the pump 35 delivers its flow, when the engine is started, to the manually opened control valve 42, which bypasses the hydraulic fluid from the pump 35 through a filter 43 back to the pump 35. No flow is delivered to the hydraulic motor 36, thus leaving the lift rotor 26 stationary.

In the second operational cycle, which is the Rotor Drive Activated Cycle, the cycle is initiated by the pilot manually closing the control valve 42, which blocks the flow through the bypass line 44 and sends the hydraulic fluid in path 51 up to the hydraulic motor 36. Gauge 45 in the main supply conduit or line 46 from the hydraulic pump 35 monitors the working pressure in that line. The outflow of hydraulic fluid from the motor 36 goes through the manually opened control valve 47 and thence through the filter 43 and back to the hydraulic pump 35. Gradual closing of the control valve 42 produces a smooth, chatter-free engagement of the auxiliary rotor drive. Steady state operation is obtained when the control valve 42 is fully closed and valve 47 is fully open. The supply tank 37 replenishes oil quantity in the circuit as needed.

Unsteady-state operations may occur, once the drive is fully engaged, as main propulsion engine speed is varied up or down as required by maneuvering. Since the lift rotor 26 has much greater inertia than the engine 12, provisions are made to prevent overstressing the system. Thus, to prevent overpressure when the engine 12 is speeded up more rapidly than the rotor 26 can follow, a relief valve 48, shown as a spring-loaded check valve, opens at a previously determined high pressure setting, for example about 2,000 psi, and bypasses the excess flow to the filter 43. Likewise, when the engine 12 is throttled down, the rotor 26 is permitted to overrun the auxiliary drive by the check valve 49, which allows reverse flow through the line 44 in bypassing relation to the closed control valve 42.

The third main operational cycle is the Auto Rotation Cycle. Full capacity of the hydraulic drive is used only during motor spin-up and the takeoff run. When cruising flight is established, the engine 12 is throttled back, and consequently the hydraulic pump delivery pressure of pump 35 as measured by the gauge 45, is automatically lowered. Hydraulic pumps used in this system have a torque converter characteristic of decreasing the driving torque when input speed is decreased, and vice versa. An example of a suitable hydraulic pump for use in this autogyro and having these characteristics is the pump designated as PGG2-0025-AA1A2 manufactured by Gresen Manufacturing Company of Minneapolis, Minn., and a suitable hydraulic motor for use therewith is the motor designated. MGG2-0030-AB1A2 manufactured by the same company. Therefore, in cruising flight, as the rotor rpm, or revolutions per minute, varies due to gusts and maneuvering loads, the hydraulic rotor drive formed by the pump 35 and motor 36 tends to speed up when the rotor rpm slows down and vice versa. This is an important novel safety feature because autogyro rotors on occasion might slow down dangerously after a prolonged period of "low g" maneuver, or a down gust. Thus, this hydraulic drive, in fact, tends to stabilize rotor rpm under all flight conditions which has a beneficial effect on the autogyro's overall flight stability.

The fourth main operational cycle, termed the Overriding Cycle, when time comes to land, the pilot throttles back the main propulsion engine 12 to establish a power-off glide. At this time the rotor 26 is allowed to override the main propulsion engine 12 by virtue of the hydraulic motor 36 becoming a pump and circulating the hydraulic fluid flow through the open valve 47, the free-flow check valve 49, and back to the hydraulic motor 36. This overriding, or free-wheeling action is available automatically at any time the lift rotor 26 turns faster than its drive system.

In the fifth, or Rotor Stopping Operational Cycle, occurs when the landing is completed. The pilot opens the control valve 42 and closes shut the valve 47. This can be done consecutively, or simultaneously if the two valves are mechanically interconnected, the latter being the preferred embodiment. The broken line shown between the valves 42 and 47 in FIG. 3 symbolizes this mechanical interconnection. When this is done, the hydraulic motor 36 acts as a pump and the fluid flow can no longer go through the closed valve 47. Instead, it has to go through a pre-loaded relief check valve, indicated at 50, connected in bypass relation to the valve 47, which opens at a predetermined over-pressure of, for example, about 500 psi and thus produces braking on the hydraulic motor 36. The flow then proceeds to the open check valve 49 and back to the hydraulic motor 36.

When the lift rotor 26 comes to a complete stop, the actions of check valves 50 and 49 effectively prevent it from turning in either direction and thus act as a parking lock. Overstressing the system during sudden turns while taxiing is prevented by the relief valves 50 and 48.

While but one preferred embodiment has been described in detail hereinabove, it will be apparent that the present invention can be embodied in a number of alternate forms of power transmission systems to produce the auxiliary rotor drive effects, and thus it is desired to comprehend herein such equivalents as will be apparent to persons ordinarily skilled in the art included within the scope of the appended claims.

I claim:

1. In a gyroplane type rotary-wing aircraft including an airframe having a rudder at the trailing end thereof, a lifting rotor journaled on the airframe for tilting movement and for rotation about a substantially vertical axis of the airframe, an engine mounted on the airframe forming the forward propulsion power plant for the aircraft, a pusher configuration propulsive air-screw located directly in front of the rudder and driven by the engine for producing a substantially horizontal forward thrust; the improvement comprising a power transmission means from the engine to the rotor for powering the rotor in flight, said power transmission means having a continuously variable infinite ratio for tapping a portion of the engine power and applying it as an auxiliary rotor drive to the rotor.

2. A gyroplane type aircraft as defined in claim 1, wherein said power transmission means is an infinitely variable ratio transmission that possesses torque converter characteristics such that when rotor rotational speed decreases during operational steady-state condition, its driving torque automatically increases and vice-versa.

3. A gyroplane type aircraft as defined in claim 1, including an automatic override free-wheeling member for allowing the rotor to continue to turn independently of transmission when its variable speed ratio reaches a predetermined level.

4. A gyroplane type aircraft as defined in claim 1, wherein said power transmission means is a multiple stage transmission between the engine and the rotor, one stage of which includes a hydraulic pump and hydraulic motor coupled therewith capable of operating at a continuously variable ratio.

5. A gyroplane type aircraft as defined in claim 1, wherein said power transmission means is a three-stage compound power transmission from the engine to the rotor having a mechanical fixed-ratio first stage, a hydraulic variable-ratio second stage and a mechanical fixed-ratio third stage.

6. A gyroplane type aircraft as defined in claim 4, including a manually operated bypass valve enabling the fluid flow from the pump to be recirculated without going through the motor, thus deactivating transmission of power.

7. A gyroplane type aircraft as defined in claim 4, including a one-way check valve in a pressure line going to the motor which enables the fluid flow to recirculate through the motor allowing the rotor to free-wheel when its speed exceeds that of the drive.

8. A gyroplane type aircraft as defined in claim 7, including a hydraulic pressure line in the second stage that is equipped with a relief valve which allows spillover of fluid into a suction line of said second stage when driving pressure reaches a predetermined maximum value.

9. A gyroplane type aircraft as defined in claim 4, including a manually operated shut-off valve, paralleled by a relief valve, in the outlet line from the hydraulic motor to be used as a rotor brake, and optionally also as a parking lock.

10. a gyroplane type aircraft as defined in claim 4, including a manually operated double-acting valve formed of a bypass valve enabling the fluid flow from the pump to be recirculated without going through the motor, thus deactivating transmission of power, and including further a shut-off valve, paralleled by a relief valve, in the outlet line from the hydraulic motor to be used as a rotor brake and optionally also as a parking lock, the bypass valve and shut-off valve being mechanically interconnected to combine their actions of engaging the rotor to the engine while releasing the rotor brake, and vice-versa, in a mutually exclusive manner so that both actions cannot occur at the same time.

* * * * *